US008741072B2

(12) United States Patent
Eia

(10) Patent No.: US 8,741,072 B2
(45) Date of Patent: Jun. 3, 2014

(54) USE OF CUTTINGS VESSEL FOR TANK CLEANING

(75) Inventor: Jan Thore Eia, Kvernaland (NO)

(73) Assignee: M-I LLC, Houston, TX (US)

( * ) Notice: Subject to any disclaimer, the term of this patent is extended or adjusted under 35 U.S.C. 154(b) by 621 days.

(21) Appl. No.: 12/020,115

(22) Filed: Jan. 25, 2008

(65) Prior Publication Data

US 2008/0179095 A1 Jul. 31, 2008

Related U.S. Application Data

(60) Provisional application No. 60/887,509, filed on Jan. 31, 2007.

(51) Int. Cl.
*B08B 9/08* (2006.01)
*B08B 9/093* (2006.01)
*E21B 21/06* (2006.01)
*B01D 21/00* (2006.01)
*B01D 21/26* (2006.01)

(52) U.S. Cl.
USPC ......... 134/168 R; 134/186; 175/66; 175/206; 210/803; 210/252

(58) Field of Classification Search
USPC ........................................... 134/166 R–168 R
See application file for complete search history.

(56) References Cited

U.S. PATENT DOCUMENTS

| | | | | |
|---|---|---|---|---|
| 5,740,821 | A * | 4/1998 | Arnold | 134/113 |
| 5,882,524 | A | 3/1999 | Storey et al. | |
| 6,179,071 | B1 | 1/2001 | Dietzen | |
| 6,209,576 | B1 * | 4/2001 | Davis | 137/487.5 |
| 6,530,438 | B1 | 3/2003 | McIntyre et al. | |
| 6,698,989 | B2 * | 3/2004 | Snowdon | 414/137.1 |
| 6,702,539 | B2 | 3/2004 | Snowdon | |
| 6,709,216 | B2 | 3/2004 | Snowdon | |
| 6,887,333 | B1 * | 5/2005 | Kessler et al. | 156/230 |
| 2005/0205477 | A1 * | 9/2005 | Eriksen | 210/97 |
| 2006/0070772 | A1 | 4/2006 | deBoer | |
| 2007/0246067 | A1 * | 10/2007 | Hebert | 134/10 |

OTHER PUBLICATIONS

PCT International Search Report issued in PCT Application No. PCT/US2008/052621 dated Jun. 27, 2008 (3 pages).

PCT Written Opinion issued in PCT Application No. PCT/US2008/052621 dated Jun. 27, 2008 (4 pages).

Substantive Examination Report issued in corresponding Malaysian Application No. PI 20093123; Dated Jul. 29, 2011 (3 pages).

Examination Report issued in corresponding Argentine Application No. P080100399 with English language communication reporting the same; Dated Mar. 11, 2013 (6 pages).

Substantive Examination Report issued in corresponding Malaysian Application No. PI 20093123 dated Jun. 28, 2013 (2 pages).

* cited by examiner

*Primary Examiner* — Nicole Blan
(74) *Attorney, Agent, or Firm* — Osha Liang LLP

(57) ABSTRACT

A tank cleaning system for use at a drilling location, including a first cuttings storage vessel comprising an inlet and an outlet, at least one tank cleaning machine configured to clean a tank, a disposal vessel, and a module including a pump configured to facilitate the transfer of fluids from a clean water vessel to the at least one tank cleaning machine, and a fluid connection configured to facilitate the transfer of fluids from the outlet of the first cuttings storage vessel to the disposal vessel.

34 Claims, 6 Drawing Sheets

USE OF CUTTINGS VESSEL FOR TANK CLEANING

CROSS-REFERENCE TO RELATED APPLICATION

This application, pursuant to 35 U.S.C. §119(e), claims priority to U.S. Provisional Application Ser. No. 60/887,509, filed Jan. 31, 2007. That application is incorporated by reference in its entirety.

BACKGROUND OF THE DISCLOSURE

1. Field of the Disclosure

Embodiments disclosed herein relate generally to integrating a vessel used for cuttings storage and/or transport with a second operation performed on a rig. More specifically, embodiments disclosed herein relate to use of a cuttings storage vessel in a tank cleaning system.

2. Background

In the drilling of wells, a drill bit is used to dig many thousands of feet into the earth's crust. Oil rigs typically employ a derrick that extends above the well drilling platform. The derrick supports joint after joint of drill pipe connected end-to-end during the drilling operation. As the drill bit is pushed further into the earth, additional pipe joints are added to the ever lengthening "string" or "drill string". Therefore, the drill string typically includes a plurality of joints of pipe.

Fluid "drilling mud" is pumped from the well drilling platform, through the drill string, and to a drill bit supported at the lower or distal end of the drill string. The drilling mud lubricates the drill bit and carries away well cuttings generated by the drill bit as it digs deeper. The cuttings are carried in a return flow stream of drilling mud through the well annulus and back to the well drilling platform at the earth's surface. When the drilling mud reaches the platform, it is contaminated with small pieces of shale and rock that are known in the industry as well cuttings or drilling cuttings. Once the drilling cuttings, drilling mud, and other waste reach the platform, a "shale shaker" is typically used to remove the drilling mud from the drilling cuttings so that the drilling mud may be reused. The remaining drilling cuttings, waste, and residual drilling fluid are then transferred to a holding trough for disposal. In some situations, for example with specific types of drilling mud, the drilling mud may not be reused and must be disposed. Typically, the non-recycled drilling mud is disposed of separate from the drilling cuttings and other waste by transporting the drilling mud via a vessel to a disposal site.

The disposal of the drilling cuttings and drilling mud is a complex environmental problem. Drilling cuttings may contain not only the residual drilling mud product that would contaminate the surrounding environment, but may also can contain oil and other waste that is particularly hazardous to the environment, especially when drilling in a marine environment.

In the Gulf of Mexico, for example, there are hundreds of drilling platforms that drill for oil and gas by drilling into the subsea floor. These drilling platforms may be used in places where the depth of the water can be many hundreds of feet. In such a marine environment, the water is typically filled with marine life that cannot tolerate the disposal of drilling cuttings waste. Therefore, there is a need for a simple, yet workable solution to the problem of disposing of well drill cuttings, drilling mud, and/or other waste in offshore marine environments and other fragile environments.

Traditional methods of disposal have been dumping, bucket transport, cumbersome conveyor belts, screw conveyors, and washing techniques that require large amounts of water. Adding water creates additional problems of added volume and bulk and transport problems. Installing conveyors requires major modification to the rig area and involves extensive installation hours and expense.

Another method of disposal includes returning the drilling cuttings, drilling mud, and/or other waste via injection under high pressure into an earth formation. Generally, the injection process involves preparation of a slurry within surface-based equipment and pumping of the slurry into a well that extends relatively deep underground into a receiving stratum or adequate formation. Material to be injected back into a formation must be prepared into a slurry acceptable to high pressure pumps used in pumping material down a well. The particles are usually not uniform in size and density, thus making the slurrification process complicated. If the slurry is not the correct density, the slurry often plugs circulating pumps. The abrasiveness of the material particles may also abrade the pump impellers causing cracking. Some centrifugal pumps may be used for grinding the injection particles by purposely causing pump cavitations.

The basic steps in the injection process include the identification of an appropriate stratum or formation for the injection; preparing an appropriate injection well; formulation of the slurry, which includes considering such factors as weight, solids content, pH, gels, etc.; performing the injection operations, which includes determining and monitoring pump rates such as volume per unit time and pressure; and capping the well.

In some instances, the cuttings, which are still contaminated with some oil, are transported from a drilling rig to an offshore rig or ashore in the form of a very thick heavy paste for injection into an earth formation. Typically the material is put into special skips of about 10 ton capacity which are loaded by crane from the rig onto supply boats. This is a difficult and dangerous operation that may be laborious and expensive.

U.S. Pat. No. 6,179,071 discloses that drill cuttings may be stored in a holding tank or multiple tanks on a drilling rig. The holding tank is then connected to a floating work boat with a discharge flow line. Cuttings may then be transferred to the boat via the flow line.

U.S. Pat. No. 6,709,216 and related patent family members disclose that cuttings may also be conveyed to and stored in an enclosed, transportable vessel, where the vessel may then be transported to a destination, and the drill cuttings may be withdrawn. The transportable storage vessel has a lower conical section structured to achieve mass flow of the mixture in the vessel, and withdrawal of the cuttings includes applying a compressed gas to the cuttings in the vessel. The transportable vessels are designed to fit within a 20 foot ISO container frame. These conical vessels will be referred to herein as ISO vessels.

As described in U.S. Pat. No. 6,709,216 and family, the ISO vessels may be lifted onto a drilling rig by a rig crane and used to store cuttings. The vessels may then be used to transfer the cuttings onto a supply boat. The vessels may also serve as buffer storage while a supply boat is not present. Alternatively, the storage vessels may be lifted off the rig by cranes and transported by a supply boat.

Space on offshore platforms is limited. In addition to the storage and transfer of cuttings, many additional operations take place on a drilling rig, including tank cleaning, slurrification operations, drilling, chemical treatment operations, raw material storage, mud preparation, mud recycle, mud separations, and many others.

Due to the limited space, it is common to modularize these operations and to swap out modules when not needed or when space is needed for the equipment. For example, cuttings containers may be offloaded from the rig to make room for modularized equipment used for tank cleaning operations. Modularized tank cleaning operations may include a water recycling unit of an automatic tank cleaning system, such as described in U.S. Patent Application Publication No. 20050205477, assigned to the assignees of the present invention and hereby fully incorporated by reference.

The lifting operations required to swap modular systems, as mentioned above, may be difficult, dangerous, and expensive operations. Additionally, many of these modularized operations are self-contained, and therefore include redundant equipment, such as pumps, valves, and tanks or storage vessels.

There exists a need for more efficient use of deck space and equipment. Additionally, there exists a need to minimize the number or size of lifts to or from a rig. Accordingly, there is a continuing need for systems and methods for efficiently cleaning tanks, as well as recovering and recycling fluids used during tank cleaning, at a drilling location.

SUMMARY OF THE DISCLOSURE

In one aspect, embodiments disclosed herein relate to a tank cleaning system for use at a drilling location. The tank cleaning system may include a first cuttings storage vessel comprising an inlet and an outlet, at least one tank cleaning machine configured to clean a tank, a disposal vessel, and a module including a pump configured to facilitate the transfer of fluids from a clean water vessel to the at least one tank cleaning machine, and a fluid connection configured to facilitate the transfer of fluids from the outlet of the first cuttings storage vessel to the disposal vessel.

In another aspect, embodiments disclosed herein relate to a module configured to integrate a cuttings storage vessel into a tank cleaning system. The module may include a pump configured to facilitate the transfer of fluids from a clean water vessel to a tank cleaning machine, and a fluid connection configured to facilitate the transfer of fluids from an outlet of a first cuttings storage vessel to the to a disposal vessel.

In another aspect, embodiments disclosed herein relate to a method for converting a drill cuttings storage vessel for use in a tank cleaning operation. The method may include fluidly connecting the above described module to the cuttings storage vessel.

In another aspect, embodiments disclosed herein relate to a method for operating a tank cleaning system comprising using a vessel for cuttings storage, and using the vessel in a tank cleaning operation.

Other aspects and advantages will be apparent from the following description and the appended claims.

DETAILED DESCRIPTION

In one aspect, embodiments disclosed herein relate to systems and methods for cleaning tanks at drilling locations. Drilling locations may include both on-shore and off-shore drill sites, as well as, in certain embodiments, system components not connected to drilling apparatus. Additionally, embodiments disclosed herein relate to tank cleaning systems and methods for cleaning tanks using a module-based tank cleaning system. More specifically, such embodiments relate to using a module-based tank cleaning system to convert cuttings storage and transfer vessels into components of a drilling fluid recovery system.

Figure 1:
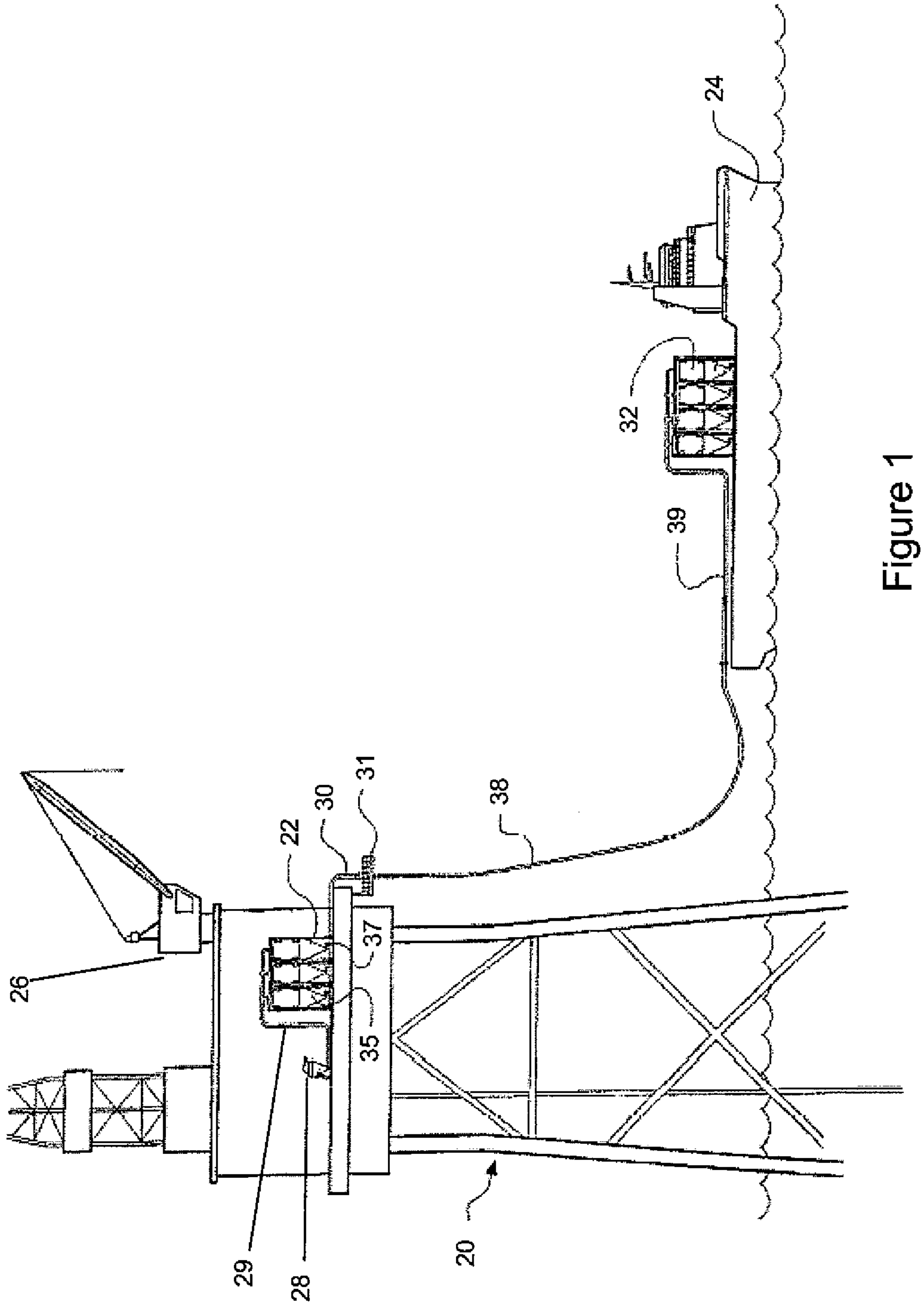
FIG. 1 is a schematic diagram illustrating a cuttings transfer system useful in embodiments disclosed herein.

Referring to FIG. 1, a method of offloading drilling cuttings from an off-shore drilling rig, according to one embodiment of the present disclosure, is shown. In this embodiment, an offshore oil rig 20 may have one or more vessels 22 located on its platform. Vessels 22, in various embodiments, may include raw material storage tanks, waste storage tanks, or any other vessels commonly used in association with drilling processes. In other embodiments, vessels 22 may include cuttings boxes, tanks, and ISO-PUMPS (a trademark of Cleancut Technologies Limited, Glasgow, United Kingdom). In some embodiments, vessels 22 may include one or more drill cuttings storage tanks fluidly connected to allow the transfer of cuttings therebetween. Such cuttings storage vessels 22 may be located within a support framework (not shown), such as an ISO container frame. As such, those of ordinary skill in the art will appreciate that vessels 22 may be used for both drill cuttings storage and transport.

As described above with respect to prior art methods, when vessels 22 are no longer needed during a drilling operation, or are temporarily not required for operations taking place at the drilling location, vessels 22 may be offloaded to a supply boat 24. Other systems and vessels for performing different operations may then be lifted onto the rig via crane 26, and placed where vessels 22 were previously located. In this manner, valuable rig space may be saved; however, conserving space in this manner may require multiple dangerous and costly crane lifts.

Drill cuttings generated during the drilling process may be transmitted to the vessels 22 for storage and/or subsequent transfer in a number of different ways. One such method of transferring drill cuttings is via a pneumatic transfer system including a cuttings blower 28 and pneumatic transfer lines 29, such as disclosed in U.S. Pat. Nos. 6,698,989, 6,702,539, and 6,709,216, hereby incorporated by reference herein. However, those of ordinary skill in the art will appreciate that other methods for transferring cuttings to storage vessels 22 may include augers, conveyors, and pneumatic suction systems.

When cuttings need to be offloaded from rig 20 to supply boat 24, cuttings may be discharged through pipe 30 to a hose connection pipe 31. A supply boat 24, having one or more containers 32, may be brought close to oil rig 20. Supply boat 24 may be fitted with a storage assembly that may include a number of additional cuttings storage vessels 32, including, for example, ISO-PUMPS.

To facilitate transfer, each vessel 22 may have a lower conical shaped hopper portion 35 and at the lowermost point of this portion there may be a valve inlet 37, whereby the material within the vessels 22 may be discharged via pipe 30 to a hose connection pipe 31. A flexible hose 38 may be connected to pipe 30 at hose connection pipe 31. At its other end, hose 38 may be connected to a filling pipe 39 located on boat 24, where filling pipe 39 may be used to transport cuttings, cuttings slurry, or other fluids from vessels 22 to containers 32.

In contrast to the prior art methods, embodiments disclosed herein may provide for use of vessels 22 in two or more operations that are performed on drilling rig 20. In one aspect, embodiments disclosed herein relate to use of a cuttings storage vessel in at least two operations performed on a rig. In some aspects, embodiments disclosed herein relate to operating a vessel 22 for both cuttings storage/transfer and as part of a second operation. More specifically, embodiments disclosed herein relate to using a cuttings storage vessel 22 as a cuttings storage/transfer vessel and as a component in a tank cleaning system. Although described with respect to integrating cuttings storage vessels into a tank cleaning system, those skilled in the art will appreciate that any vessel located at a drilling location for performing in a specified drilling operation may be integrated into the tank cleaning systems and methods disclosed herein.

Figure 2:
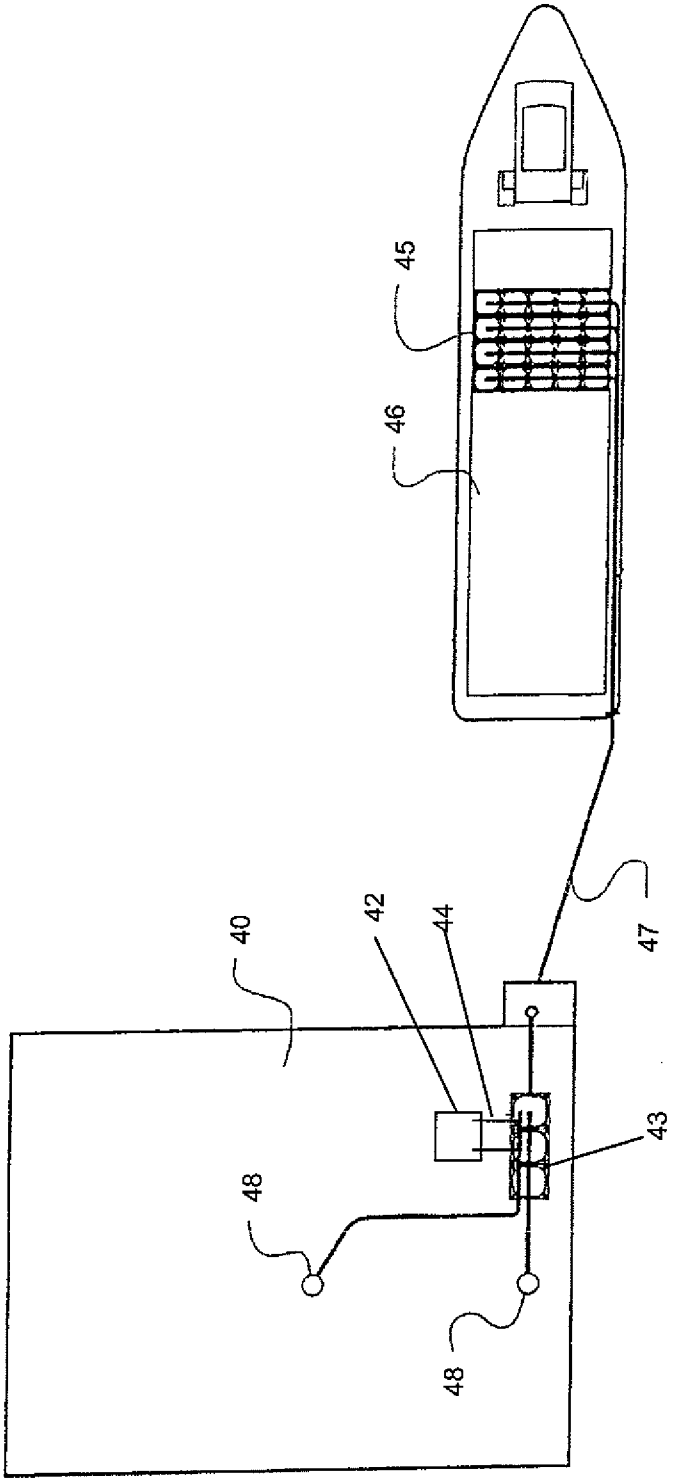
FIG. 2 is a schematic diagram illustrating use of cuttings storage vessels in both a cuttings storage/transfer system and a tank cleaning system in accordance with embodiments disclosed herein.

Referring to FIG. 2, a rig 40, including a tank cleaning system module 42 in accordance with one embodiment of the present disclosure, is shown. System module 42 may be located anywhere on rig 40, and in some embodiments is located proximate cuttings storage vessels 43, or a vessel assembly 43, that may be fluidly connected to system module 42 via connection lines 44. In one embodiment, cuttings storage vessels 43 may be detachably connected to a second set of storage vessels 45 located on a supply boat 46 by a flexible hose 47.

In operation, cuttings may be transferred to cuttings storage vessels 43 via one or more pneumatic transfer devices 48 located on rig 40. The cuttings may be stored in cuttings storage vessels 43 until they are transferred to supply boat 46 for disposal thereafter.

Cuttings transfer systems and tank cleaning systems, as described above, are typically independent systems, where the systems may be located on rig 40 permanently or may be transferred to rig 40 from supply boat 46 when such operations are required. However, in embodiments disclosed herein, tank cleaning module 42 may be located on rig 40 proximate cuttings storage vessels 43, and transfer lines 44 may be connected therebetween to enable use of the cuttings storage vessels 43 with tanks, pumps, filter systems, cleaning equipment, water supply tanks, and other components that may be used in a tank cleaning operation. Such integrated systems may allow for existing single use structures (e.g., cuttings storage vessels 43) to be used in multiple operations (e.g., tank cleaning systems and cuttings storage/transfer). Thus, when not being used to store or transport cuttings, vessels 43 may be operated in a tank cleaning system.

As described above, previous tank cleaning systems required the conversion of valuable drilling rig space for tank cleaning equipment. However, embodiments described herein allow existing structural elements (i.e., cuttings storage vessels) to be used in multiple operations. Tank cleaning module 42 may be relatively small compared to previous tank cleaning systems, thereby preserving valuable rig space, and preventing the need for costly and dangerous lifting operations. Those of ordinary skill in the art will appreciate that the systems as illustrated in FIGS. 1 and 2 are only exemplary, and alternate systems incorporating additional components may also be used in tank cleaning systems disclosed herein. Illustrative examples of such systems are described in greater detail below.

Figure 3:
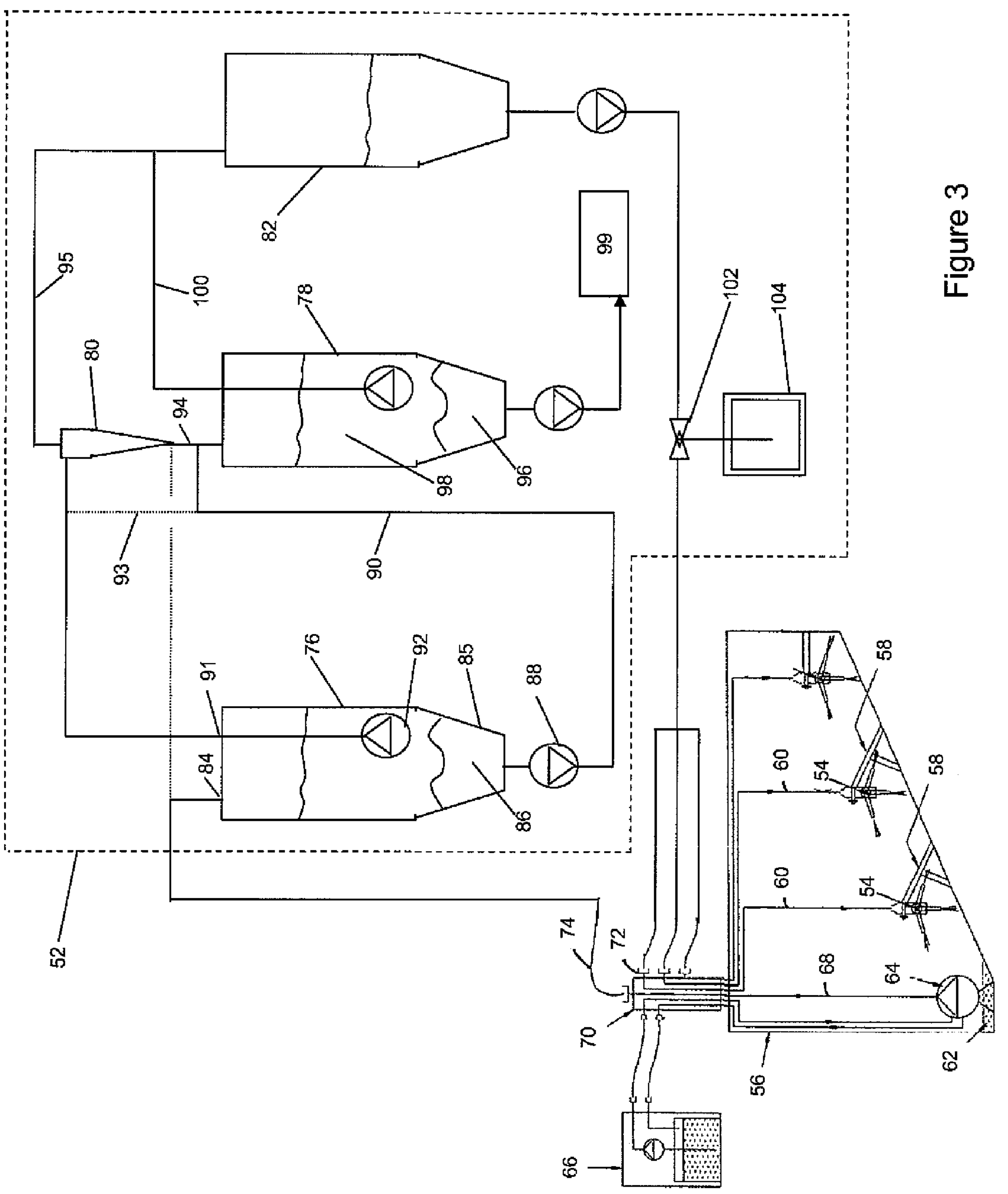
FIG. 3 is a simplified flow diagram of a tank cleaning system according to embodiments disclosed herein.

Referring now to FIG. 3, a tank cleaning system incorporating at least one drill cuttings vessel is illustrated. The tank cleaning system may include a water recycling unit 52 and one or more manual or automated tank cleaning machines, such as rotary jet head washers 54. Rotary jet head washers 54 may be positioned within a mud tank 56, or any other tank being cleaned. Although shown as being fixed in position, these multi-headed or single-headed nozzle rotary jet head washers 54 may be lowered into the tank 56 or otherwise suspended and positioned temporarily or permanently within the tank 56 using brackets 58, stands, penetration through the deck/side of the tank, or the like. The rotary jet head washers 54 may be supplied with pressurized wash fluid by way of the wash fluid lines 60. The rotation of the nozzles might be provided by a pneumatic motor or by a turbine in the cleaning fluid flow. As the wash fluid exits the rotary jet head washers 54, tank 56 is washed with pressurized wash fluid that dislodges any solids or sediment present in tank 56, generating tank slop 62, a combination of solids and wash fluid.

A hydraulic pump 64 may be connected to a hydraulic power unit 66, so that hydraulic pump 64 may sit on the tank slop 62 and pump the combination of solids (such as from drilling or other fluids used on the drilling location that could contaminate the tank) and wash fluid up the tank slop line 68. As shown, the hydraulic pump 64 is lowered into the tank 56 for use in the washing operation; alternatively, the pump 56 may be mounted either temporarily on brackets or permanently mounted in the tank 56. The tank slop line 68 may carry the tank slop 62 directly to the water recycling unit 52 or through a modular fluid distribution manifold 70 designed with control valves (not shown) and hose connections 72, or quick connect hose lines in some embodiments. Tank slop 62 may then be transmitted by way of external slop line 74 to the water recycling unit 52.

Water recycling unit 52 may include a water recovery tank 76, a cuttings box 78, and a filtration system 80. Water recycling unit 52 may also include a clean water tank 82. In some embodiments, one or more of the water recovery tank and the cuttings box may be as described in U.S. Patent Application Publication No. 20050205477. In some embodiments, one or more cuttings storage vessels, as disclosed above, may be integrated into the tank cleaning system and may function as one or more of the water recovery tank 76, the cuttings box 78, and the clean water tank 82.

The tank slop 62 may be pumped into a top portion of the water recovery tank 76 at an inlet 84. The water recovery tank 76 may have a sloped bottom 85 that may be round, square, or rectangular. Solids 86 from the tank slop 62 may settle to the bottom of the water recovery tank 76 and may gather in the sloped bottom 85. The solids 86 that collect at the sloped bottom 85 of the water recovery tank 76 may then be pumped by an auger fed progressive cavity pump 88 to the cuttings box 78 through a line 90. Alternatively, solids 86 may be released from the water recovery tank 76 by a valve and pumped to the cuttings box 78.

The liquid in the water recovery tank 76 may be pumped to one or more filtration systems 80, which may include one or more hydrocyclones, centrifuges, filters, filter presses, and hydrocarbon filters. In some embodiments, the liquid may be transmitted through an outlet 91, such as by a diving pump or submersible pump 92. In other embodiments, a solids-rich fraction and a solids-lean fraction may be sequentially pumped from water recovery tank 76 via pump 88, where the solids-rich fraction may be directed to cuttings box 78, and the dirty water or solids-lean fraction may be transmitted to filtration system 80 through line 93. Other alternative flow schemes may also be used, such as where the settling efficiency is sufficient to develop a clean water fraction in water recovery unit 76.

In a hydrocyclone 80, for example, small solids that did not settle out of the fluid when introduced in the water recovery tank 76 may be removed by the centrifugal force created within the hydrocyclone 80. Solids may be directed by purge flow line 94 from the hydrocyclone 80 to the cuttings box 78. Additionally, the solids may be gravity fed or pumped from the hydrocyclone 80 to the cuttings box 78 or to a disposal vessel. The overflow from the hydrocyclone 80 may be directed through line 95 to the clean water tank in some embodiments, or recycled to directly supply water to the rotary jet head washers 54 in other embodiments.

The cuttings box 78 may be used to further promote the settling of the solids 86 from the slurry. Cuttings box 78 may be any cuttings box normally found onboard drilling rigs, for example, or may be a cuttings storage vessel. Cuttings box 78 may separate the solids 86 into a solids fraction 96 and a solids-lean fraction 98. In some embodiments, an oil fraction (not shown) may also form in cuttings box 78. The solids fraction 96 may be pumped to a disposal vessel 99, for example, a cuttings storage vessel, for later disposal. The solids-lean fraction 98 may be pumped via fluid line 100 to the clean water tank 82 or recycled to directly supply water to the rotary jet head washers 54.

As previously discussed, the cuttings box 78 may be any cuttings box as used onboard a rig and as typically used to transport drill cuttings. Once a first cuttings box 78 is nearly full with solids 96, a second cuttings box (not individually illustrated) may then replaces the first cuttings box 78. Valves (not shown) may be used to temporarily stop or divert the flow to the cuttings box 78 while it is replaced with a second cuttings box.

Alternatively, a cuttings storage vessel may be integrated into a tank cleaning system and may function as a cuttings box. When a cuttings storage vessel 22 operating as a cuttings box is nearly full with solids and liquids, additional cutting storage vessels, if available, may be used as a cuttings box, separating solids and liquids.

In some embodiments, the clean water recovered from the water recovery tank 76 and the cuttings box 78 may be pumped through flow lines 60 to one or more rotary jet head washers 54 to clean the tank 56. In other embodiments, the clean water recovered from the water recovery tank 76 may be returned to an existing clean water storage vessel (not shown) on the rig. In yet other embodiments, the clean water recovered from the water recovery tank 76 may be stored in a cuttings storage vessel operating as a storage tank for use in the tank cleaning system 52.

To assist the cleaning of tanks 56 using the above described tank cleaning system, it may be desired to use various chemicals, such as cleaning chemicals, in addition to the water provided to rotary jet head washers 54. A wide variety of wash fluids may be used, including detergents, surfactants, anti-foaming agents, suspending agents, lubricating agents (to reduce the wear caused by the flowing solids), and the like, to assist in the quick and efficient cleaning of the tank 56. A chemical inductor 102 may be used to add such cleaning chemicals 104 to the wash water.

As described above, a cuttings storage vessel may be integrated into the cleaning system and may function as one or more of the water recovery tank, the cuttings box, and the clean water tank. In some embodiments, where a cuttings storage vessel functions as a water recovery tank or a cuttings box, more than one outlet may be provided for pumping the solids and liquid fractions. In other embodiments, the solids fraction and liquid fractions may be sequentially transmitted from the cuttings tank to their respective destinations. Sequential transmission may be facilitated by providing a sight glass for an operator to visually determine when the flow has changed from the solids fraction to a solids-lean fraction. Alternatively, measurement of conductance or density may be used to indicate when the flow has changed from the solids fraction to a solids-lean fraction. Upon determination of the flow transition, an operator or automated system may appropriately redirect the flow.

In some embodiments, a settling efficiency of solids within a cuttings storage vessel may eliminate the need for various components of the cleaning system. For example, a cuttings storage vessel may have a larger volume, diameter, or height than current water recovery tanks and cuttings boxes used in tank cleaning systems, such that the flow of tank slop into the cuttings storage vessel may not disturb the settling of solids.

Alternatively, use of a cuttings storage vessel or more than one cuttings storage vessel as a water recovery tank may allow complete or nearly complete settling of solids in one cuttings storage vessel prior to pumping the solids fraction and the solids-lean fraction from the cuttings storage vessel. Where complete or nearly complete settling of solids in a cuttings storage vessel may be achieved, it may be possible, in some embodiments, to eliminate the cuttings box from the tank cleaning system.

Figure 4:
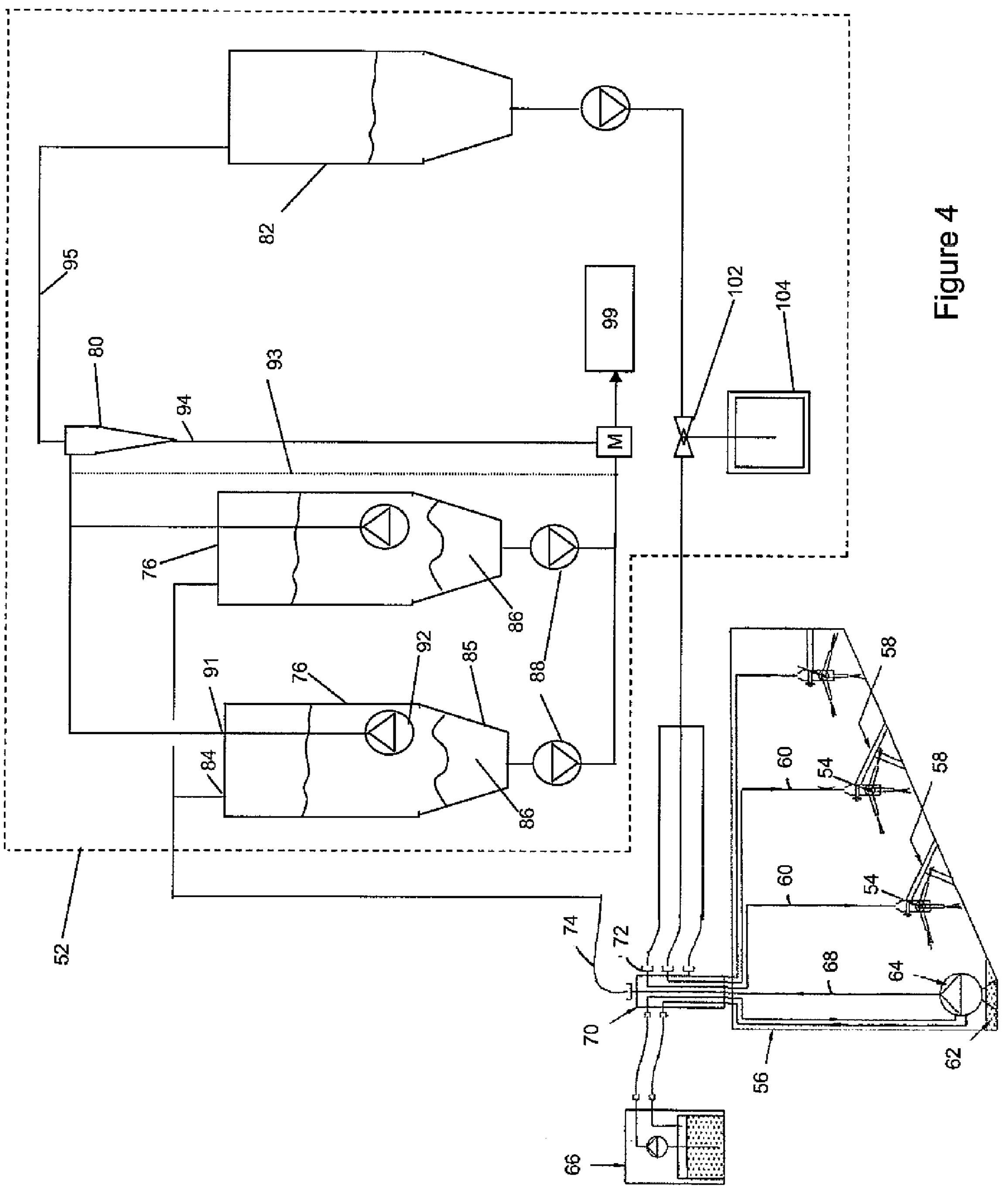
FIG. 4 is a simplified flow diagram of a tank cleaning system according to embodiments disclosed herein.

Referring now to FIG. 4, another embodiment of a tank cleaning system 52 integrating at least one cuttings storage vessel is illustrated, where like numerals represent like components. In this embodiment, adequate liquid-solids separations may be attained in cuttings storage vessel(s) to allow the cuttings box to be excluded from the system. Solids fraction 86 pumped from one or more cuttings storage vessels 76 functioning as a water recovery tank may be mixed in a mixer M and may be accumulated in a separate disposal vessel 99 for later disposal. Dirty water may be processed in hydrocyclone 80, separating solids 94 and clean water 95. As above, the solids and solids-lean fractions may be pumped through separate outlets from water recovery tanks 76, or may be sequentially pumped from the sloped bottom 85 of the water recovery tanks 76, where the solids-lean fraction may be transmitted via line 93 to hydrocyclone 80.

In some embodiments, the use of hydrocyclones 80 to remove fine solids from the water may not be necessary for the operation of the tank cleaning system 52 due to the settling that may be attained within a cuttings storage vessel. Efficiency of the system 52 may be reduced when no further separation operations, such as hydrocyclone 80, are included. Thus, processing of a solids-lean fraction from a cuttings storage vessel through hydrocyclones 80 may be optional in some embodiments; in other embodiments, a cleaning system may not include hydrocyclones.

As illustrated and described with respect to FIGS. 3-4, one or more cuttings storage vessels may be integrated into a tank cleaning system and may function as a water recovery tank, a cuttings box, and/or a clean water storage tank. In some embodiments, the one or more cuttings storage vessels may be integrated into a tank cleaning system using a module. A module may allow for equipment used in the tank cleaning system to be conveniently lifted to the rig when needed and from the rig when cleaning operations have concluded. Depending upon the function of a cuttings storage vessel in the tank cleaning system, the module may include one or more fluid connections that are in fluid communication with an inlet or an outlet of a cuttings storage vessel, or that are in fluid communication with other external components of a tank cleaning system, such as a tank slop pump. Components contained in the module may include the components of the tank cleaning system, as described above with respect to FIGS. 3-4, excluding the vessels that the cuttings storage vessels may be functioning as and/or replacing.

Figure 5:
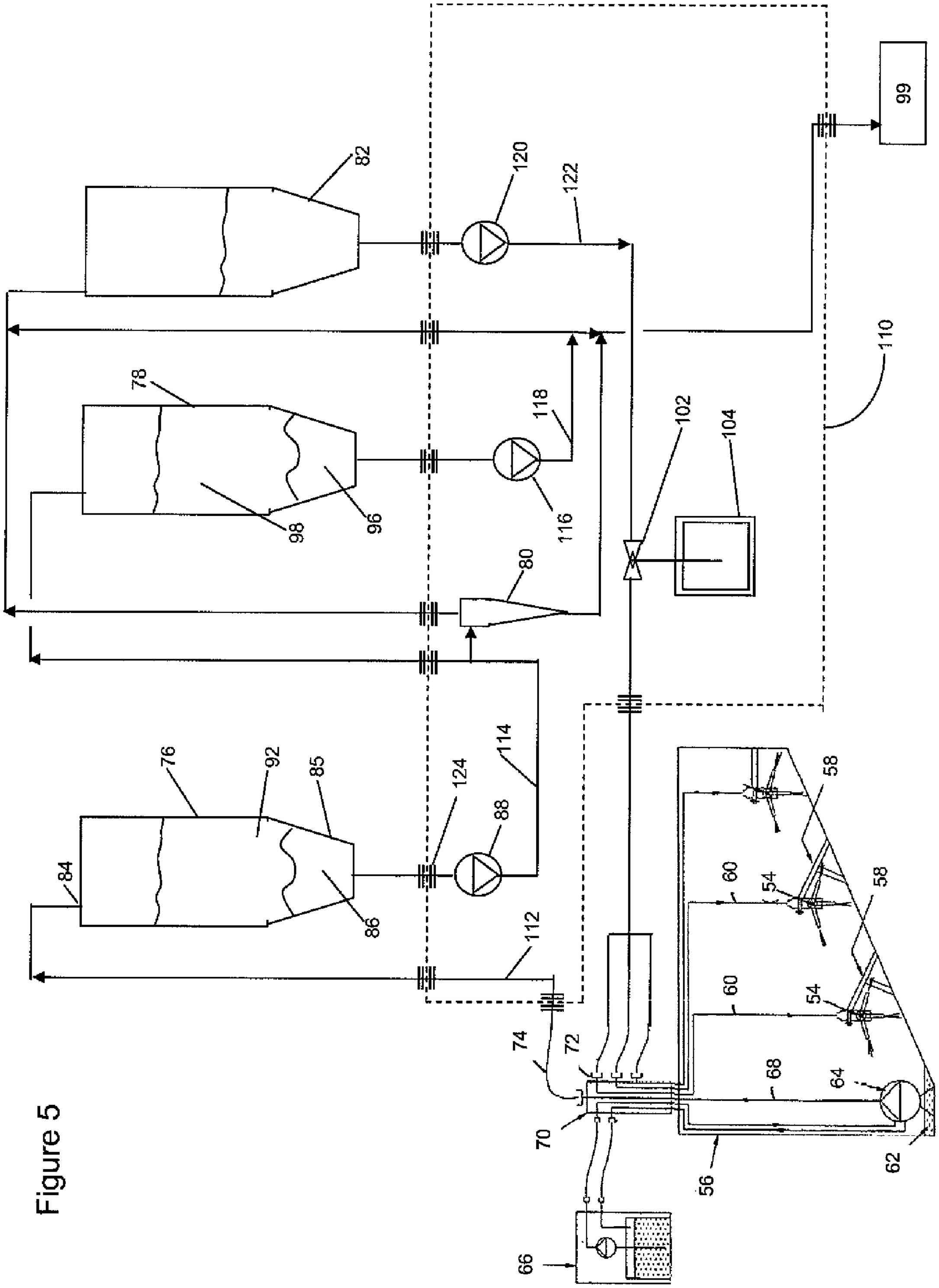
FIG. 5 illustrates a module for converting a cuttings storage/transfer system into a tank cleaning system in accordance with embodiments disclosed herein.
Figure 6:
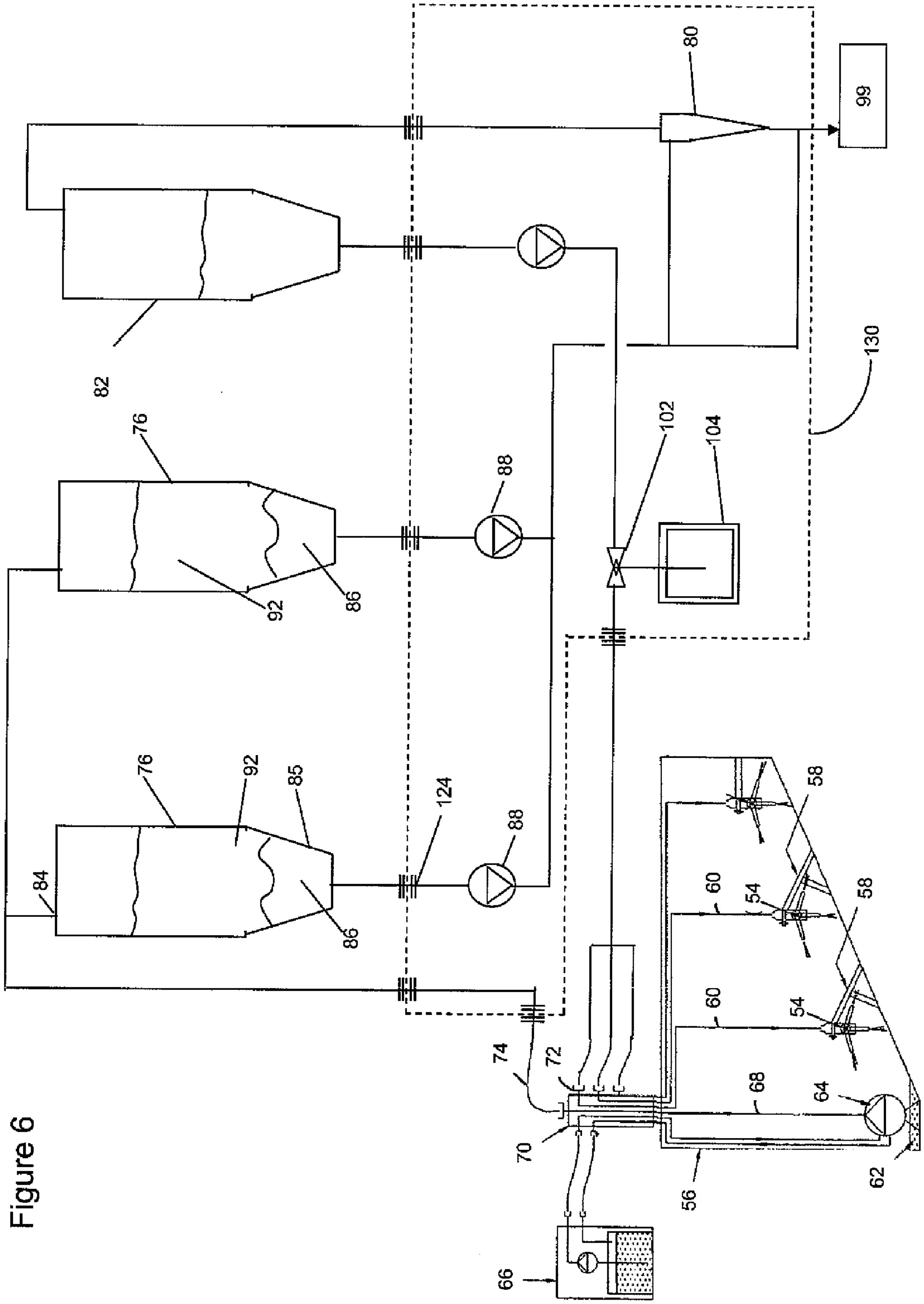
FIG. 6 illustrates another module for converting a cuttings storage/transfer system into a tank cleaning system in accordance with embodiments disclosed herein.

As illustrated in FIGS. 5-6, one or more cuttings storage vessels may be integrated into a tank cleaning system using a module, where like numerals represent like parts. As illustrated, the tank cleaning system flow diagrams illustrate modules where materials in the cuttings vessels are pumped sequential from the vessel. One skilled in the art would appreciate that other flow schemes, for example, having a separate pump for the solids-lean fractions, may be included with the modules. One skilled in the art would also appreciate that other equipment not shown on the simplified flow diagrams may also be used, including valves, control valves, power supplies, filters, pressure regulators, and the like.

Referring now to FIG. 5, one embodiment of a module 110 to integrate one or more cuttings storage vessels into a tank cleaning system according to embodiments disclosed herein, is illustrated. As cuttings storage vessels may function as one or more of the water recovery tank 76, the cuttings box 78, and the clean water storage tank 82, the equipment contained in a module may vary. For example, module 110 may provide a fluid communication conduit 112 for transmitting tank slop 62 from line 74 to inlet 84 of vessel 76. Additionally, module 110 may include pumps 88 and conduit 114 for transmitting solids 86 and solid-lean fluids 92 from water recovery tank 76 to filtration system 80 and cuttings box 78. Module 110 may also provide pumps 116 and conduit 118 for transmitting solids 96 and solids-lean fractions 98 from cuttings box 78 to disposal vessel 99 and clean water tank 82, respectively. Further, module 110 may include pumps 120 and conduit 122 for transmitting clean water from water tank 82 to rotary jet head cleaners 54. Where not individually provided on a rig, module 110 may also include a chemical inductor 102 and cleaning chemicals 104.

Connections 124 between conduit within module 110, the integrated cuttings storage vessels, and distribution manifold 70 may be flanged, screwed, or quick-connect connections. Additionally, module 110 may include spooled conduit for attaching to various inlets and outlets of the cuttings storage vessels, disposal vessels 99, and manifold 70. Spooled conduit may be useful for attaching to inlets and outlets remote from the location where the module is located on the rig.

Referring now to FIG. 6, another embodiment of a module to integrate cuttings storage vessels into a tank cleaning system, according to embodiments disclosed herein, is illustrated. One or more cuttings storage vessels may be integrated into a tank cleaning system using a module 130, where the cuttings storage vessels are used in parallel as water recovery tanks 76, similar to FIG. 5, without a cuttings box. Similar to module 110, module 130 may provide for pumps and fluid communication between flow manifold 70, vessels 76, 82, 99, hydrocyclone 80 (when used), and chemical inductor 102 and cleaning chemicals 104.

The modules described above with respect to FIGS. 5-6 may additionally include programmable logic controllers, digital control system connections, chemical inductor(s) and cleaning chemical tank(s), power connections, among other equipment and lines. For example, a control system may be provided to locally or remotely operate the tank cleaning system.

Other module systems for integrating cuttings storage vessels into a tank cleaning system may be envisaged. The modules described above with respect to FIGS. 5-6 may include or exclude various components due to the existing lines and equipment located on the rig, and the type and number of cuttings storage vessels integrated into a tank cleaning system. For example, FIGS. 5-6 illustrate integration of three cuttings storage vessels, whereas additional or fewer cuttings storage vessels may be integrated, requiring fewer or additional components to be included in the module.

In some embodiments, ISO-PUMPS may be used as cuttings storage vessels integrated into the tank cleaning system. ISO-PUMPS may be used to transfer cuttings and fluids between vessels without the need for a pump 88, for example. Where ISO-PUMPS may provide for transmitting fluids and solids between vessels, the equipment required for modules 110, 130 may be further minimized.

As mentioned above, where cuttings storage vessels may provide for adequate separation of the liquids and solids fractions, hydrocyclone 80 may not be a necessary component. Thus, in some embodiments, hydrocyclone 80 and related equipment and lines may not be included in module 110, 130.

Additionally, existing lines may be provided for fluid communication between the cuttings storage vessels integrated into the cuttings storage system using a module 110, 130. For example, a cuttings storage system may provide for communication between one cuttings storage vessel outlet and an inlet of a second cuttings storage vessel. Additionally, a cuttings storage system may provide for common inlet and/or common outlet lines. Module 110, 130 may advantageously connect to these common lines, simplifying and/or minimizing the lines and equipment needed to integrate the cuttings storage vessels into a tank cleaning system.

Advantageously, integration of vessels on the rig deck may minimize the size of the modular operations lifted to the deck. For example, a module for a tank cleaning operation may be made smaller due to the integration with existing vessels on the rig deck. Eliminating vessels from the module may allow for a smaller module, decreasing the size (width, height and/or length) and the weight of the module. The decreased size may lower shipping costs associated with module transport, and may provide additional room on the supply ship for additional materials being brought to the rig or offloaded from the rig.

Additionally, embodiments disclosed herein may advantageously provide for efficient use of deck space and equipment. Additionally, embodiments disclosed herein may minimize the number of lifts to or from a rig. The efficient use of equipment and decreased number of lifts may lower operating costs, may decrease the time required to change between rig operations, and may improve rig safety.

While the subject matter has been described with respect to a limited number of embodiments, those skilled in the art, having benefit of this disclosure, will appreciate that other embodiments can be devised which do not depart from the scope of the invention as disclosed herein. Accordingly, the scope should be limited only by the attached claims.

What is claimed:

1. A tank cleaning system comprising:

a first cuttings storage vessel comprising an inlet and an outlet, wherein the first cuttings storage vessel comprises a pneumatic transfer device;

at least one tank cleaning machine configured to clean a tank;

a disposal vessel; and a module comprising:

a pump configured to facilitate the transfer of fluids from the first cuttings storage vessel to the at least one tank cleaning machine, and a fluid connection configured to facilitate the transfer of fluids from the outlet of the first cuttings storage vessel to the disposal vessel.

2. The tank cleaning system of claim 1, wherein the module further comprises:

a fluid connection for transmitting tank slop from a tank being cleaned to the first cuttings storage vessel for separating the tank slop into a solids-rich fraction and a solids-lean fraction.

3. The tank cleaning system of claim 1, wherein the module further comprises:

a fluid connection for transmitting a solids-rich fraction from at least one of a water recovery tank and the first cuttings storage vessel to a second cuttings storage vessel.

4. The tank cleaning system of claim 1, wherein the module further comprises:

a fluid connection for transmitting a solids-lean fraction from the first cuttings storage vessel to a separator to separate the solids-lean fraction into a solids fraction and a clean water fraction.

5. The tank cleaning system of claim 4, wherein the separator comprises at least one of a hydrocyclone, a centrifuge, a filter, a filter press, and a hydrocarbon filter.

6. The tank cleaning system of claim 5, wherein the separator is disposed in the module.

7. The tank cleaning system of claim 4, further comprising:

a fluid connection for transmitting the solids fraction to at least one of the disposal vessel, a cuttings box, and a third cuttings storage vessel; and a fluid connection for transmitting the clean water fraction to at least one of a clean water vessel, a fourth cuttings storage vessel, and a tank cleaning machine.

8. The tank cleaning system of claim 1, wherein the module further comprises:

a fluid connection for transmitting cleaning chemicals to the tank cleaning machine.

9. The tank cleaning system of claim 1, further comprising a chemical inductor in fluid communication with a water communication conduit for providing cleaning chemicals to the tank cleaning machine.

10. The tank cleaning system of claim 1, further comprising a cuttings box in fluid communication with the cuttings storage vessel.

11. The tank cleaning system of claim 1, further comprising a pump for transmitting the tank slop from the tank being cleaned to the cuttings storage vessel.

12. The tank cleaning system of claim 1, further comprising a mixer for mixing solids fractions or solids-rich fractions from at least two of a separator, a water recovery tank, a cuttings box, the first cuttings storage vessel, and a second cuttings storage vessel.

13. The tank cleaning system of claim 1, further comprising a modular fluid distribution manifold operable to control flow of fluid and dislodged solids from the tank being cleaned to the first cuttings storage vessel.

14. The tank cleaning system of claim 1, wherein the tank cleaning machine comprises a rotary jet head washer for dispersing cleaning chemicals and water in the tank being cleaned.

15. The tank cleaning system of claim 1, further comprising a valve disposed in a fluid connection between the first cuttings storage vessel, a second cuttings storage vessel, and a separator.

16. The tank cleaning system of claim 15, wherein the valve further comprises a sensor for adjusting the flow of fluid.

17. The tank cleaning system of claim 1, further comprising a programmable logic controller operatively coupled to the tank cleaning system.

18. An apparatus comprising:

a first cuttings storage vessel; and a module comprising:

a pump configured to facilitate the transfer of fluids from the first cuttings storage vessel to a tank cleaning machine; and a fluid connection configured to facilitate the transfer of fluids from an outlet of the first cuttings storage vessel to a disposal vessel where the first cuttings storage vessel comprises a pneumatic transfer device.

19. The apparatus of claim 18, further comprising:

a fluid connection for transmitting tank slop from a tank being cleaned to the first cuttings storage vessel for separating the tank slop into a solids-rich fraction and a solids-lean fraction.

20. The apparatus of claim 18, further comprising:

a fluid connection for transmitting a solids-rich fraction from at least one of the water recovery tank and the first cuttings storage vessel to a second cuttings storage vessel.

21. The apparatus of claim 18, further comprising:

a fluid connection for transmitting a solids-lean fraction from the first cuttings storage vessel to a separator to separate the solids-lean fraction into a solids fraction and a clean water fraction.

22. The apparatus of claim 21, wherein the separator comprises at least one of a hydrocyclone, a centrifuge, a filter, a filter press, and a hydrocarbon filter.

23. The apparatus of claim 22, wherein the separator is disposed in the module.

24. The apparatus of claim 21, further comprising:

a fluid connection for transmitting the solids fraction to at least one of the disposal vessel, a cuttings box, and a third cuttings storage vessel; and a fluid connection for transmitting the clean water fraction to at least one of the clean water tank, a fourth cuttings storage vessel, and the tank cleaning machine.

25. The apparatus of claim 18, further comprising:

a fluid connection for transmitting cleaning chemicals to the tank cleaning machine.

26. The apparatus of claim 18, further comprising a chemical inductor in fluid communication with a water communication conduit for providing cleaning chemicals to the tank cleaning machine.

27. The apparatus of claim 18, further comprising a cuttings box in fluid communication with the cuttings storage vessel.

28. The apparatus of claim 18, further comprising a pump for transmitting the tank slop from the tank being cleaned to the cuttings storage vessel.

29. The apparatus of claim 18, further comprising a mixer for mixing solids fractions or solids-rich fractions from at least two of a separator, a water recovery tank, a cuttings box, the first cuttings storage vessel, and the second cuttings storage vessel.

30. The apparatus of claim 18, further comprising: a fluid distribution manifold operable to control flow of fluid and dislodged solids from the tank being cleaned to the first cuttings storage vessel.

31. The apparatus of claim 18, wherein the tank cleaning machine comprises a rotary jet head washer for dispersing cleaning chemicals and water in the tank being cleaned.

32. The apparatus of claim 18, further comprising a valve disposed in a fluid connection between the first cuttings storage vessel, a second cuttings storage vessel, and a separator.

33. The apparatus of claim 32, further comprising wherein the valve further comprises a sensor for adjusting the flow of fluid.

34. The apparatus of claim 18, further comprising a programmable logic controller operatively coupled to the tank cleaning machine.

* * * * *